March 1, 1932.  H. MARLES  1,847,721

STEERING GEAR

Filed Jan. 12, 1931    2 Sheets-Sheet 1

INVENTOR
Henry Marles
BY Whittemore Hulbert
Whittemore Belknap
ATTORNEYS

March 1, 1932.   H. MARLES   1,847,721
STEERING GEAR
Filed Jan. 12, 1931   2 Sheets-Sheet 2
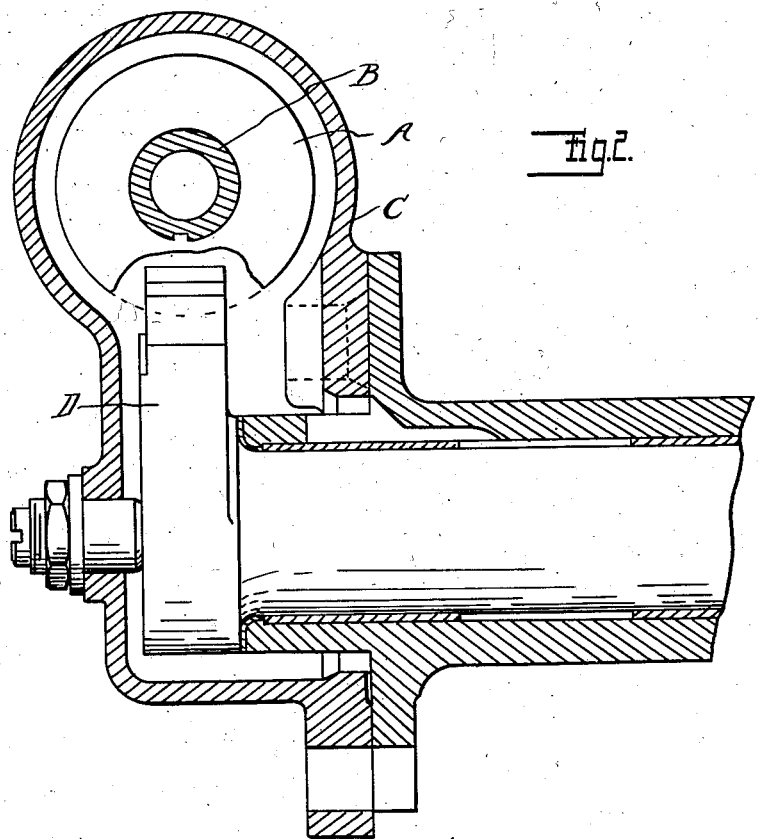
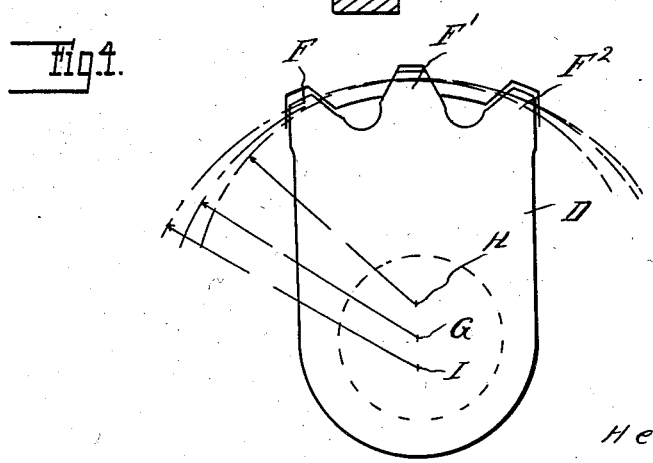
INVENTOR
Henry Marles
BY Whittemore Hulbert
Whittemore & Belknap
ATTORNEYS Patented Mar. 1, 1932

1,847,721

UNITED STATES PATENT OFFICE

HENRY MARLES, OF DETROIT, MICHIGAN, ASSIGNOR TO GEMMER MANUFACTURING COMPANY, OF DETROIT, MICHIGAN, A CORPORATION OF MICHIGAN

STEERING GEAR

Application filed January 12, 1931. Serial No. 508,346.

The invention relates to steering gears of that type employing an hour-glass worm cooperating with a non-developed worm gear. It is the primary object of the invention to increase the range of angular movement which can be imparted to the worm gear without increasing the complexity or manufacturing cost. To this end the invention consists in the construction as hereinafter set forth.

In the drawings:

Figure 2 is a cross section in the plane of the rock shaft;

Figure 4 is a diagram illustrating the relation of the teeth of the gear segment to the axis of rotation thereof and to the worm.

Figures 1, 3:
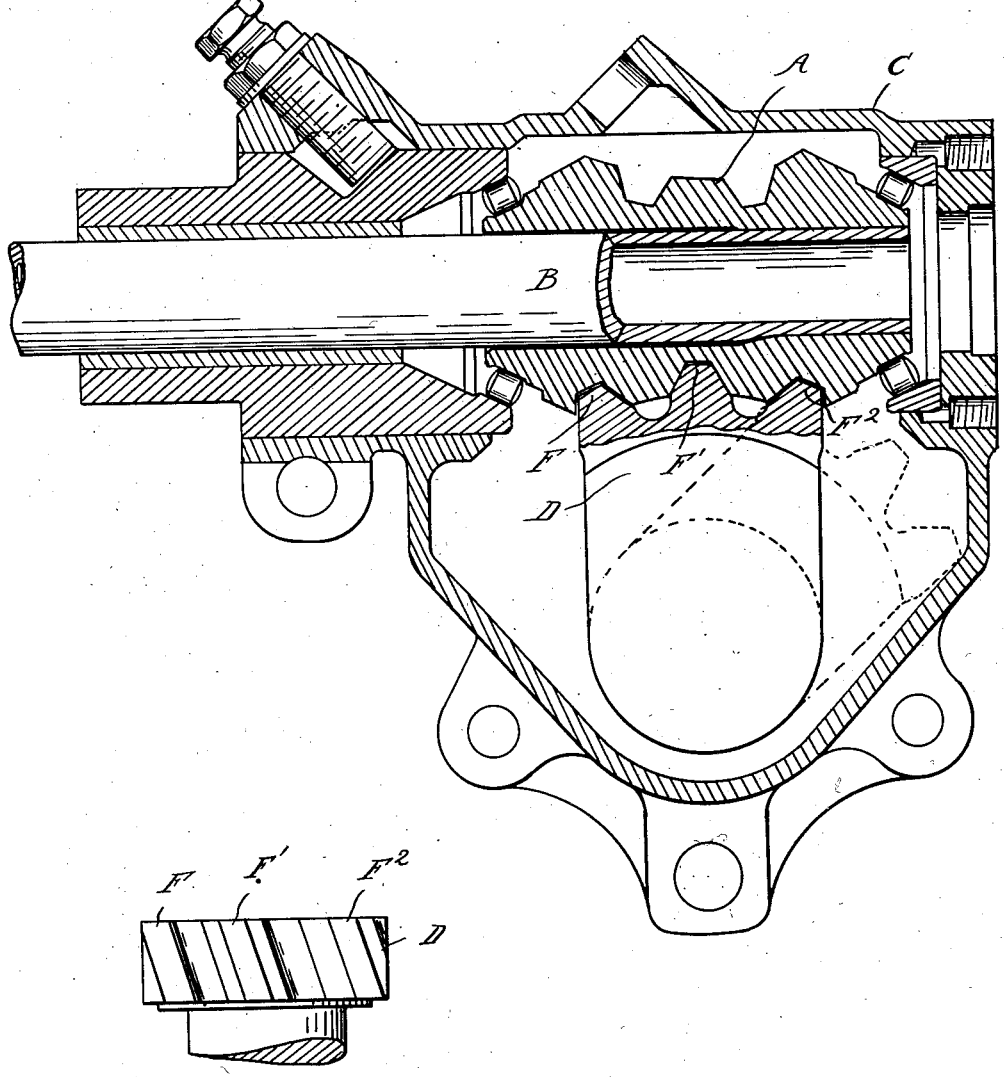
Figure 1 is a section through a steering gear of my improved construction substantially in the plane of the axis of the worm.
Figure 3 is a plan view of a gear segment.

In the manufacture of steering gears of the type above referred to, the process is simplified by substituting gear segments with non-developed teeth for gears having developed teeth, for the reason that the former can be fashioned by the operation of a planer or shaper instead of being cut on a gear cutting machine. Such constructions are not theoretically correct unless restricted to a single tooth for a plurality of teeth that are simultaneously formed by the movement of a cutter in a rectilinear path can not traverse the worm without interference with each other. In other words, the teeth so made are not exact duplicates of each other and do not sustain the same angular relation to the thread of the worm. This difficulty has been to some extent overcome by forming the gear segment with a single female tooth between a pair of male teeth but so constructed that only one of the latter is in full engagement with the worm thread at the same time. The range of angular adjustment is thus somewhat extended but it is still limited to that possible with two teeth.

With my improvement I have extended the range of angular adjustment still further, the construction being as follows:

A is a worm gear of the hour-glass type mounted upon the steering shaft B within a gear housing C and D is my improved worm gear mounted upon a rock shaft E and in mesh with the worm. As shown, this worm gear has three male teeth F, F' and F², all of which are simultaneously fashioned by a shaping tool having rectilinear movement. As a consequence, the teeth F F' F² differ from each other in form so that no one could by rotation occupy the position exactly coincident with that of another tooth.

To avoid interference the teeth F F' F² are formed to be concentric with a point which does not lie in the axis of rotation of the gear but is of a shorter radius. Furthermore, the axis of rotation of the gear does not coincide with the center of development of the hour-glass worm but is of a shorter radius. Thus as illustrated diagrammatically in Figure 4, G is the axis of rotation of the gear segment, H is a point with which the gear teeth are concentric, the mean radius of the teeth from said point being less than the radius from the point G, and I is a point which is the center of generation of the hour-glass worm, this being of a longer radius than that to the axis G.

The gear segments being constructed as just described when placed in mesh with the worm and in a central position will have the tooth F' only in full engagement, the teeth F and F² forming a clearance with the worm by reason of the shorter mean radii. When, however, the gear segment is rotated about its axis through the operation of the worm, one of the teeth such as F will be brought into closer mesh with the work at the same time that the tooth F' is withdrawing from close contact due to the longer radius of generation of the worm. The arrangement is such that when either one of the outside teeth F F² is moved to the center of the worm it will have greater clearance than the tooth F' which will compensate for inaccuracy in form. Also the tooth F' in moving away from the center of the worm is provided with a greater clearance so as not to interfere with the tooth F or F² which is engaged. Thus the degree of angular movement which may be imparted to the gear segment is greater than has been possible with non-developed gear segments heretofore used.

What I claim as my invention is:

1. In a steering gear, the combination with a worm of the hour-glass type, of a gear segment having a central tooth and a plurality of teeth arranged on opposite sides thereof, all such as might be simultaneously formed by the transverse rectilinear movement of a forming tool, said central tooth in the central position of the gear being in full engagement with the worm and the teeth on opposite sides thereof being concentric to a different axis and being of a lesser mean radius than that from the axis of the worm to provide compensating clearance for the inaccuracy in form.

2. In a steering gear, the combination with a worm of the hour-glass type, of a gear segment having an axis of slightly lesser radius than the axis of generation of the hour-glass worm, said gear segment having a central tooth and a plurality of teeth on opposite sides thereof, said central tooth in the central position of the segment being in full engagement with said worm and having clearance when upon opposite sides of said central position and the teeth on opposite sides of said central tooth being concentric with an axis of lesser mean radius than the axis of the segment to provide additional clearance to compensate for inaccuracy in form.

3. In a steering gear, the combination with a worm of the hour-glass type, of a gear segment having a central tooth and a plurality of teeth on opposite sides thereof, said central tooth in its central position being of a radial length from the axis of the segment slightly less than the radius of generation of the worm, and the teeth on opposite sides thereof being of lesser mean radius than said central tooth for the purpose described.

In testimony whereof I affix my signature.

HENRY MARLES.